(12) United States Patent
Xie

(10) Patent No.: US 8,096,378 B2
(45) Date of Patent: Jan. 17, 2012

(54) GOLF BAG VEHICLE

(75) Inventor: Chunlei Xie, Shanghai (CN)

(73) Assignee: Kunshan Peak-Cart Golf Equipment Co., Ltd., Economic & Technology Development Area, Kunshan, Jiangsu (CN)

( * ) Notice: Subject to any disclaimer, the term of this patent is extended or adjusted under 35 U.S.C. 154(b) by 317 days.

(21) Appl. No.: 12/422,326

(22) Filed: Apr. 13, 2009

(65) Prior Publication Data

US 2010/0252338 A1  Oct. 7, 2010

(51) Int. Cl.
*B60K 1/00* (2006.01)
(52) U.S. Cl. ....................................................... 180/65.51
(58) Field of Classification Search ............... 180/65.51, 180/19.2, 19.3, 19.1, 216, 65.6, 167, 215, 180/65.1
See application file for complete search history.

(56) References Cited

U.S. PATENT DOCUMENTS

| | | | |
|---|---|---|---|
| 3,948,332 A * | 4/1976 | Tyner | 180/19.1 |
| 5,265,686 A * | 11/1993 | Machen | 180/169 |
| 5,375,673 A * | 12/1994 | McCall et al. | 180/13 |
| 6,481,518 B1 * | 11/2002 | Wu | 180/65.6 |
| 6,802,385 B2 * | 10/2004 | Pyntikov et al. | 180/220 |
| 6,974,399 B2 * | 12/2005 | Lo | 475/5 |
| 7,530,415 B2 * | 5/2009 | Heinen | 180/65.51 |
| 7,533,747 B2 * | 5/2009 | Heinen | 180/65.51 |
| 2006/0207814 A1 * | 9/2006 | Tseng | 180/65.5 |
| 2007/0131465 A1 * | 6/2007 | Garceau | 180/65.5 |
| 2008/0053724 A1 * | 3/2008 | Chiu et al. | 180/65.5 |
| 2008/0066979 A1 * | 3/2008 | Carter | 180/65.5 |

* cited by examiner

*Primary Examiner* — J. Allen Shriver, II
*Assistant Examiner* — James M Dolak

(57) ABSTRACT

A golf bag vehicle includes a vehicle body and a driving wheel. The vehicle body includes an axle mounting on a lower portion thereof. The driving wheel includes a wheel frame, a motor and a wheel circle. The wheel frame detachably connects to the axle, and has an inner room. The motor mounts inside the inner room, for electrically connecting with a power supply. The wheel circle receives the wheel frame therein, and is rotatable with respect to the wheel frame. The wheel circle connects with the motor, and is driven by the motor, so that the driving wheel forms a self-driven structure.

20 Claims, 7 Drawing Sheets

GOLF BAG VEHICLE

BACKGROUND OF THE PRESENT INVENTION

1. Field of Invention

The present invention relates to a golf bag vehicle, and more particularly to a golf bag vehicle which has a motor received inside a driving wheel to form a self-driven structure.

2. Description of Related Arts

Golf fields are ordinarily wide, and the golf players always carry many clubs with them, so a golf bag vehicle is necessary. In addition, the golf fields may have rolling surfaces, so it is tiring if the golf bag vehicle is pulled by man, especially on wet grass or sand. As a result, electromotive golf bag vehicles are widely welcomed.

An electromotive golf bag vehicle is ordinarily foldable, so that it can be carried in a trunk of car, and when it is idle, people can store it in a storing room conveniently. Therefore, the foldability of the golf bag vehicle becomes an important factor when judging its performance. The traditional electromotive golf bag vehicle often mounts the motor on the vehicle body, and drives the wheel with an axle. However, the vehicle of the electromotive golf bag vehicle takes much space, even if the wheel is detachable, the overall folding effect of the electromotive golf bag vehicle is limited.

Besides, the electromotive golf bag vehicle driven with a single motor can only move forwardly or backwardly along a straight line. For controlling direction of the electromotive golf bag vehicle, the traditional electromotive golf bag vehicle ordinarily has two wheels, and mounts two motors on the vehicle body to control the two wheels respectively. However, due to the differences of production and abrasion, and the complex landform, the traditional electromotive golf bag vehicle can not accurately control the two wheels to have the same rolling speed. As a result, the traditional electromotive golf bag vehicle can not move forwardly or backwardly along a straight line steadily, but turns aside unintentionally.

SUMMARY OF THE PRESENT INVENTION

An object of the present invention is to provide a golf bag vehicle, which has a motor received inside a driving wheel to utilize the room inside the driving wheel, so as to decrease the elements to be folded, and further reduce the folding volume of the golf bag vehicle.

Another object of the present invention is to provide a golf bag vehicle, which has a driving wheel, wherein the driving wheel has a self-driven structure and does not need exterior mechanical driving, so as to simplify the mechanical structure and the assembling process of the golf bag vehicle.

Another object of the present invention is to provide a golf bag vehicle, which has a driving wheel, wherein when the driving wheel works, an axle of the driving wheel keeps still, and an outer cover of the driving wheel rotates. The driving wheel is easy to be disassembled, so as to facilitate folding the golf bag vehicle and replacing the driving wheel.

Another object of the present invention is to provide a golf bag vehicle, which has at least one driving wheel, wherein the driving wheel forms an independent working unit and can be adjusted solely. With the foregoing structure, when the golf bag vehicle has a plurality of driving wheels, the working manner of the golf bag vehicle can be adjusted by controlling the driving wheels respectively.

Another object of the present invention is to provide a golf bag vehicle, which is capable of balancing and self-adjusting the rolling speed of the driving wheels in real time, so that the golf bag vehicle is capable of moving along a straight line steadily. The golf bag vehicle works stably, and is operated conveniently, and therefore is applicable to long-time and long-distance work.

Accordingly, in order to accomplish the above objects, the present invention provides a golf bag vehicle, comprising:

a vehicle body, comprising an axle mounting on a lower portion thereof;

a driving wheel, comprising: a wheel frame detachably connecting with the axle and having an inner room, a motor mounting inside the inner room for electrically connecting to a power supply, and a wheel circle receiving the wheel frame therein and rotatable with respect to the wheel frame, wherein the wheel circle connects with the motor and is driven thereby, so that the driving wheel forms a self-driven structure; and a controlling unit, comprising: a controlling module for sending an operating order, a processing module connecting with the controlling module, for receiving the operating order, and a detecting module mounting inside the inner room and connecting with the motor and the processing module, for detecting and adjusting a rolling speed of the motor, and sending the rolling speed to the processing module, wherein the processing module forwards the operating order to the detecting module, receives the rolling speed sent by the detecting module to compare with the operating order, and sends a corresponding adjusting order to the detecting module to make the rolling speed of the motor couple with the operating order.

Therefore, the motor utilizes the inner room of the wheel frame sufficiently, and reduces a volume of the golf bag vehicle. When the golf bag vehicle moves, the axle and the wheel frame keep still with respect to the vehicle body, and the wheel circle is driven to rotate by the motor, so as to move the golf bag vehicle. Meanwhile, the controlling unit detects and adjusts a working manner of the golf bag vehicle in real time.

These and other objectives, features, and advantages of the present invention will become apparent from the following detailed description, the accompanying drawings, and the appended claims.

DETAILED DESCRIPTION OF THE PREFERRED EMBODIMENT

Figure 1:
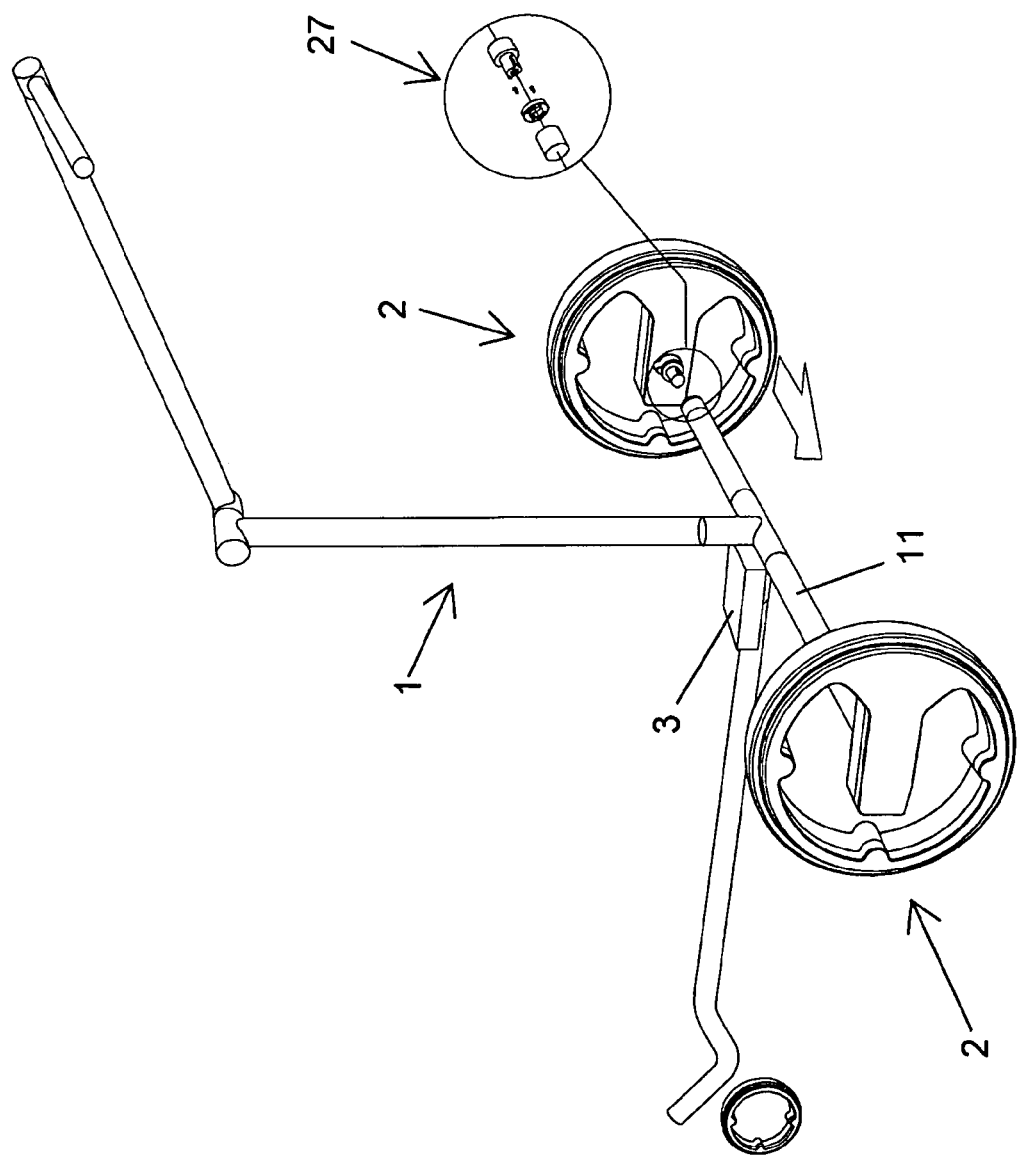
FIG. 1 is a perspective view of a golf bag vehicle according to a preferred embodiment of the present invention.
Figure 2:
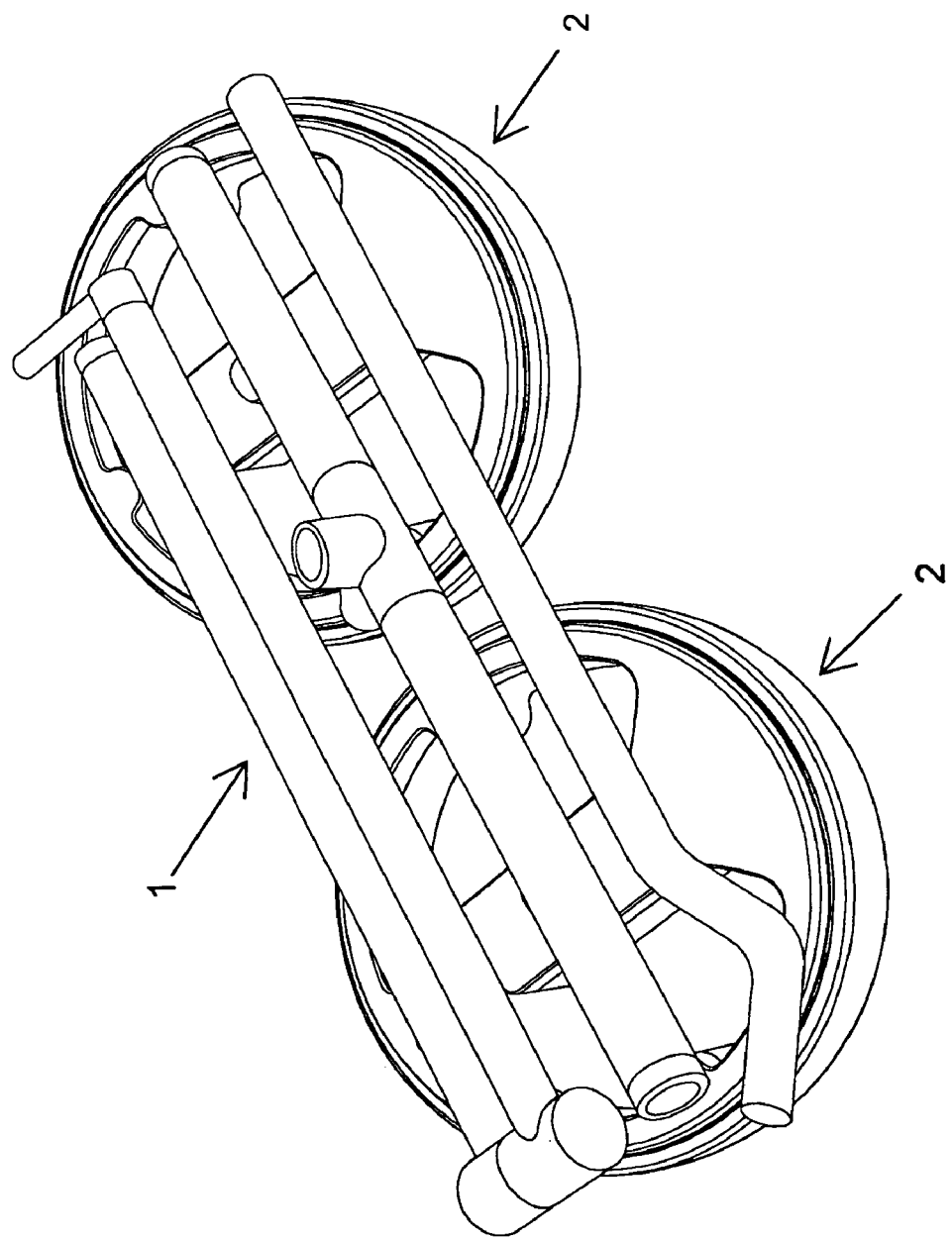
FIG. 2 is a schematic view of the golf bag vehicle in a folded manner according to the above preferred embodiment of the present invention.

Referring to FIGS. 1-5 of the drawings, a golf bag vehicle according to a preferred embodiment of the present invention is illustrated, comprising a vehicle body 1 and a driving wheel 2.

The vehicle body 1 comprises an axle 11 mounting on a lower portion thereof.

The driving wheel 2 comprises a wheel frame 21, a motor 22 and a wheel circle 23. The wheel frame 21 detachably connects to the axle 11, and has an inner room 24. The motor 22 mounts inside the inner room 24, for electrically connecting with a power supply P. The wheel circle 23 receives the wheel frame 21 therein, and is rotatable with respect to the wheel frame 21. The wheel circle 23 connects with the motor 22, and is driven by the motor 22, so that the driving wheel 2 forms a self-driven structure.

A traditional golf bag vehicle ordinarily has a wheel of large diameter and wide surface, so as to adapt for a rolling surface of a golf field, and especially avoid skidding or sinking on wet grass or sand. And for reducing a weight thereof, the wheel ordinarily has a plurality of spokes which define rooms therebetween. As a result, the traditional golf bag vehicle can not be folded satisfactorily, while the wheel still has rooms therein which can be utilized. The golf bag vehicle according to the present invention sufficiently utilizes the inner room 24 of the driving wheel 2, and receives the motor 22 therein, so as to decrease elements of the golf bag vehicle to be folded, and further reduce a folding volume of the golf bag vehicle.

Figure 4:
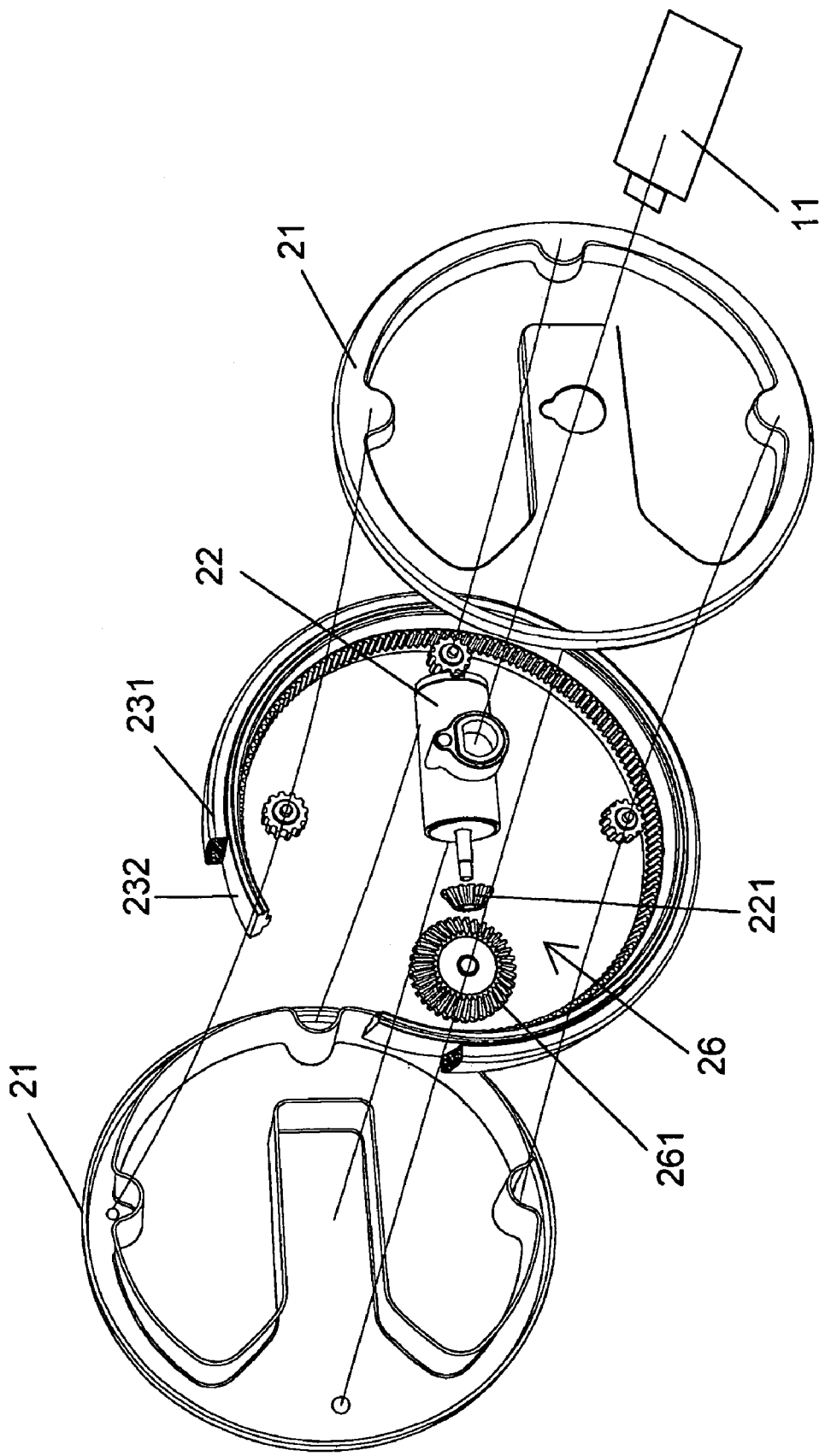
FIG. 4 is an exploded perspective view of the driving wheel of the golf bag vehicle according to the above preferred embodiment of the present invention.

Referring to FIG. 4 of the drawings, the wheel circle 23 comprises an outer cover 231 and a driving ring 232. The outer cover 231 coats on the driving ring 232. The driving ring 232 connects with the motor 22 with an inner surface thereof, so as to drive the wheel circle 23 by the motor 22. The outer cover 231 has functions of skid resistance and shock absorption, and can be replaced solely, so as to facilitate maintenance of the golf bag vehicle.

Figure 5:
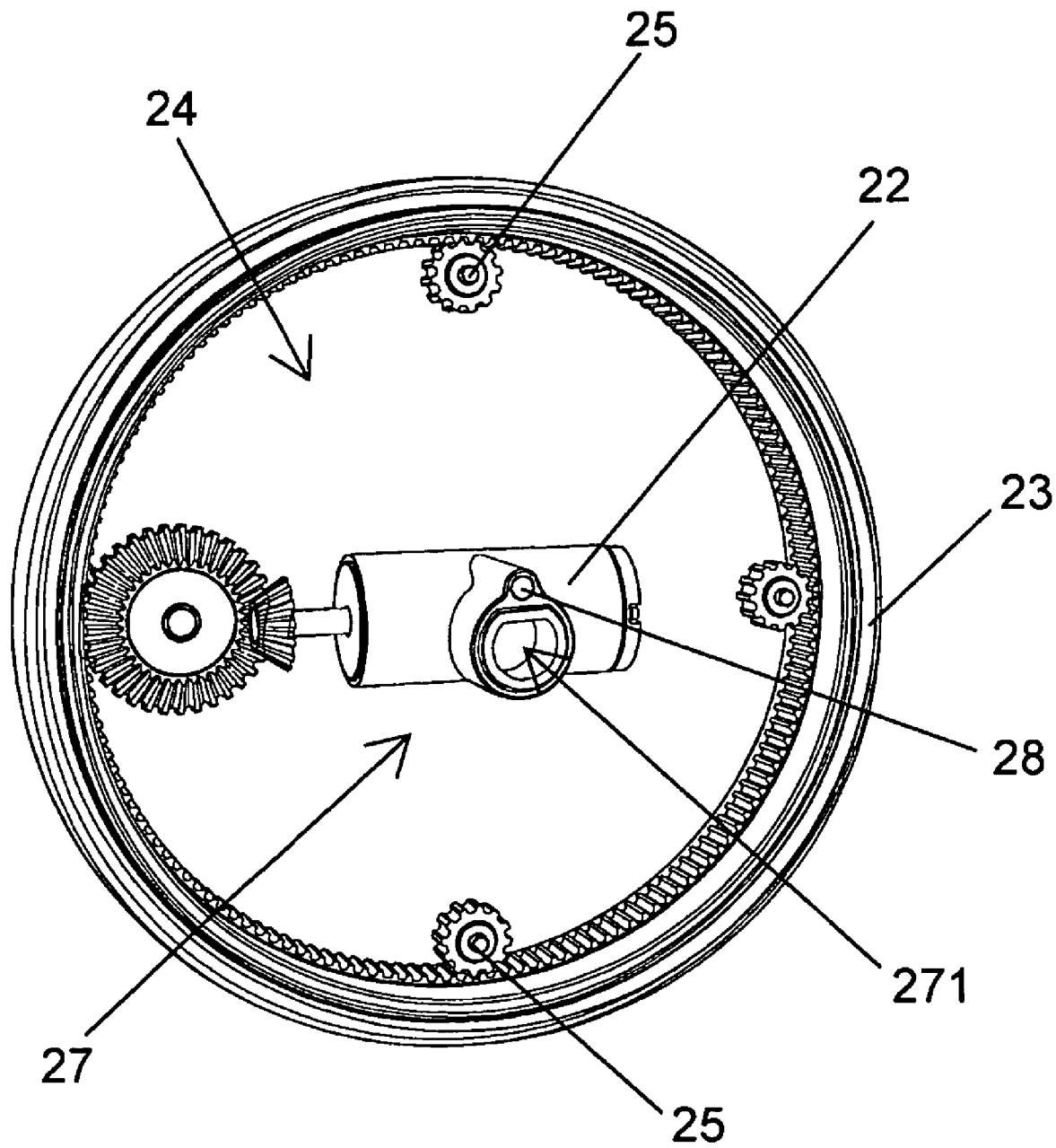
FIG. 5 is a perspective view of an interior of the driving wheel of the golf bag vehicle according to the preferred embodiment of the present invention.

Referring to FIG. 5 of the drawings, the driving wheel 2 further comprises at least a supporting wheel 25. The supporting wheel 25 rotatably mounts on the wheel frame 21, and supports on the inner surface of the driving ring 232. When the driving ring 232 rotates, the supporting wheel 25 rotates therewith. The supporting wheel 25 fixes a relative position of the driving ring 232 and the wheel frame 23, and keeps a predetermined distance therebetween, so as to avoid energy loss and damage brought by friction. In addition, by thickening the wheel circle 23, the driving wheel 2 is prevented from leaking water or sand, so as to maintain the driving wheel 2 in good condition.

According to an alternative mode, the supporting wheel 25 is replaced by a bearing containing anti-friction balls. Particularly, the wheel frame 21 further comprises a supporting ring and a plurality of anti-friction balls. The supporting ring mounts on an outer surface of the wheel circle 21, and couples with the driving ring 232. The anti-friction balls move between the supporting ring and the driving ring 232, for keeping a predetermined distance therebetween, so as to avoid energy loss and damage brought by friction.

The driving wheel 2 further comprises a transmitting unit 26. The transmitting unit 26 mounts in the inner room 24 of the wheel frame 21, and connects with the motor 22 and the driving ring 232, for transmitting motion of the motor 22 to the driving ring 232. The transmitting unit 26 can be embodied as a gear, a belt, or etc. According to a preferred embodiment of the present invention, particularly, the motor 22 is perpendicular to a rotating axis of the wheel circle 23, and comprises a motor gear 221 mounting on a head of the motor 22. The transmitting unit 26 comprises a transmitting gear 261. The transmitting gear 261 rotatably mounts on the wheel frame 21, has a rotating axis parallel to the rotating axis of the wheel circle 23, and engages with the motor gear 221. The driving ring 232 has a plurality of corresponding gear teeth provided on the inner surface thereof and engaging with the transmitting gear 261. When the driving wheel 2 operates, the motor gear 221 rotates perpendicular to a rotating axis of the driving ring 232, and the transmitting gear 261 transmits the motion of the motor 22, so that the driving ring 232 is driven to rotate by the motor 22.

By mounting the motor 22 perpendicular to the axle 11, a width of the driving wheel 2 is reduced, and the inner room 24 of the driving wheel 2 is utilized efficiently. The transmitting unit 26 realizes that the motor 22 drives the driving ring 232 efficiently and stably. In addition, a rolling speed of the driving ring 232 can be controlled and adjusted by the transmitting unit 26.

The motor gear 221 is preferably embodied as a clutch mounting between the motor 22 and the transmitting gear 261 for controlling the motor 22 and the transmitting gear 261 to detach from each other. The clutch switches the golf bag vehicle between a driving mode and a manual mode. In the driving mode, the motor 22 works to save people's energy, while in the manual mode, the wheel circle rotates freely, especially adapt for downhill path. The clutch saves energy of the club bag vehicle to extend a service life thereof, and makes controlling the golf bag vehicle easier, so as to adapt for various landforms of a golf field.

Referring to FIG. 5 of the drawings, the driving wheel 2 further comprises an assembling unit 27 mounting on the wheel frame 21. The assembling unit 27 has a fixing groove 271 for receiving the axle 11 to fix the driving wheel 2 on the axle 11. The assembling unit 27 couples with the axle 11 to finish assembling and disassembling the driving wheel 2 by simple actions, so as to greatly increase foldability of the golf bag vehicle.

The driving wheel 2 further comprises an electric data interface 28 mounting on the wheel frame 21. The motor 22 electrically connects with the power supply P via the electric data interface 28. In addition, the electric data interface 28 is integrated with the assembling unit 27, so that the driving wheel 2 can be assembled and disassembled more conveniently.

Referring to FIG. 1 of the drawings, the golf bag vehicle further comprises a controlling unit 3.

Figure 7:
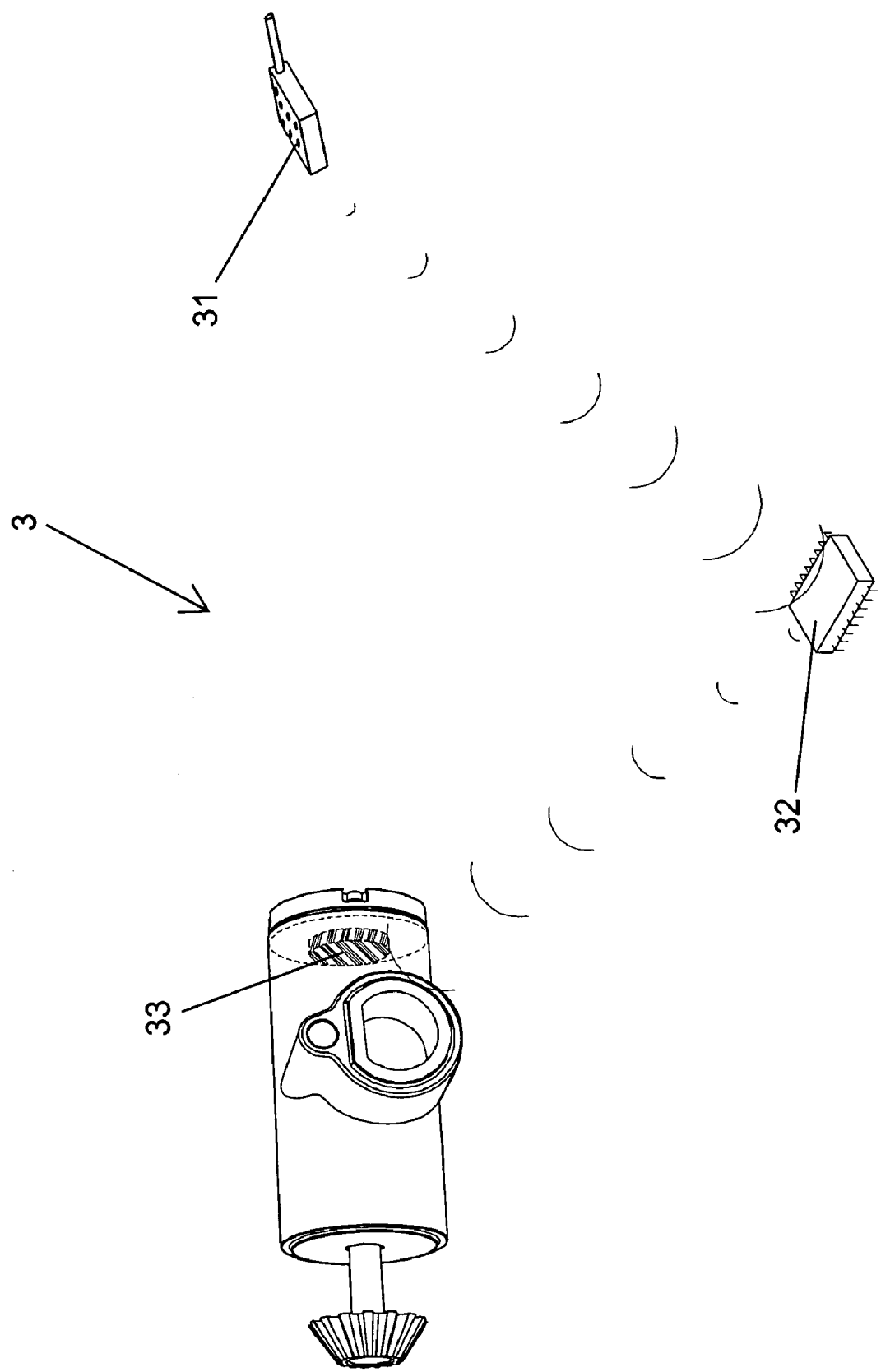
FIG. 7 is a schematic view of a controlling unit of the golf bag vehicle according to the above preferred embodiment of the present invention.

Referring to FIG. 7 of the drawings, particularly, the controlling unit 3 comprises a controlling module 31, a processing module 32 and a detecting module 33.

The detecting module 33 mounts inside the inner room 24, and connects with the motor 22 for detecting and adjusting a rolling speed of the wheel circle 23 and the motor 22. Particularly, the detecting module 33 determines the rolling speed of the wheel circle 23 by detecting a rolling speed of the motor 22 and a moving perimeter of the wheel circle 23.

The controlling module 31 connects with the processing module 32, for being inputted an operating order and sending the operating order to the processing module 32. The processing module 32 connects with the detecting module 33, for forwarding the operating order to the detecting module 33, so as to control the detecting module 33 by the controlling module 31.

Particularly, the processing module 32 is for receiving the rolling speed of the motor 22 sent by the detecting module 33, comparing with the operating order, and sending back a corresponding adjusting order to the detecting module 33 to make the rolling speed of the wheel circle 23 match with the operating order accurately. In particular working, the motor 22 may have a rolling speed not matching with the operating order, because of self-abrasion, change of friction between the wheel circle 23 and the wheel frame 21, or resistance of ground. That's why the traditional golf bag vehicle can not move along a straight line steadily. The golf bag vehicle according to the present invention makes the rolling speed of the motor 22 match with the operating order by real-time detecting of the detecting module 33 and real-time adjusting of the processing module 32. Therefore, the golf bag vehicle moves steadily, and can not only be controlled to change direction freely, but also moves forwardly or backwardly along a straight line.

The controlling module 31, the processing module 32 and the detecting module 33 can be connected by wires or wireless. Particularly, the controlling module 31 mounts on a top of the vehicle body 1 to facilitate controlling by hand. The processing module 32 mounts on a bottom of the vehicle body 1 and connects to the detecting module 33. The controlling module 31 can also be detached from the vehicle body 1, and sends the operating order to the processing module 32 by wireless, so as to remotely control the golf bag vehicle. In addition, the processing module 32 is integrated with the detecting module 33.

Particularly, the power supply P and the processing module 32 mount on the vehicle body 1, the motor 22 electrically connects with the power supply P via the electric data interface 28, and the detecting module 33 connects with the processing module 32 via the electric data interface 28, so as to control the wheel circle 23 by the controlling module 31. In addition, the processing module 32 is capable of displaying the electric quantity of the power supply P.

Figure 3:
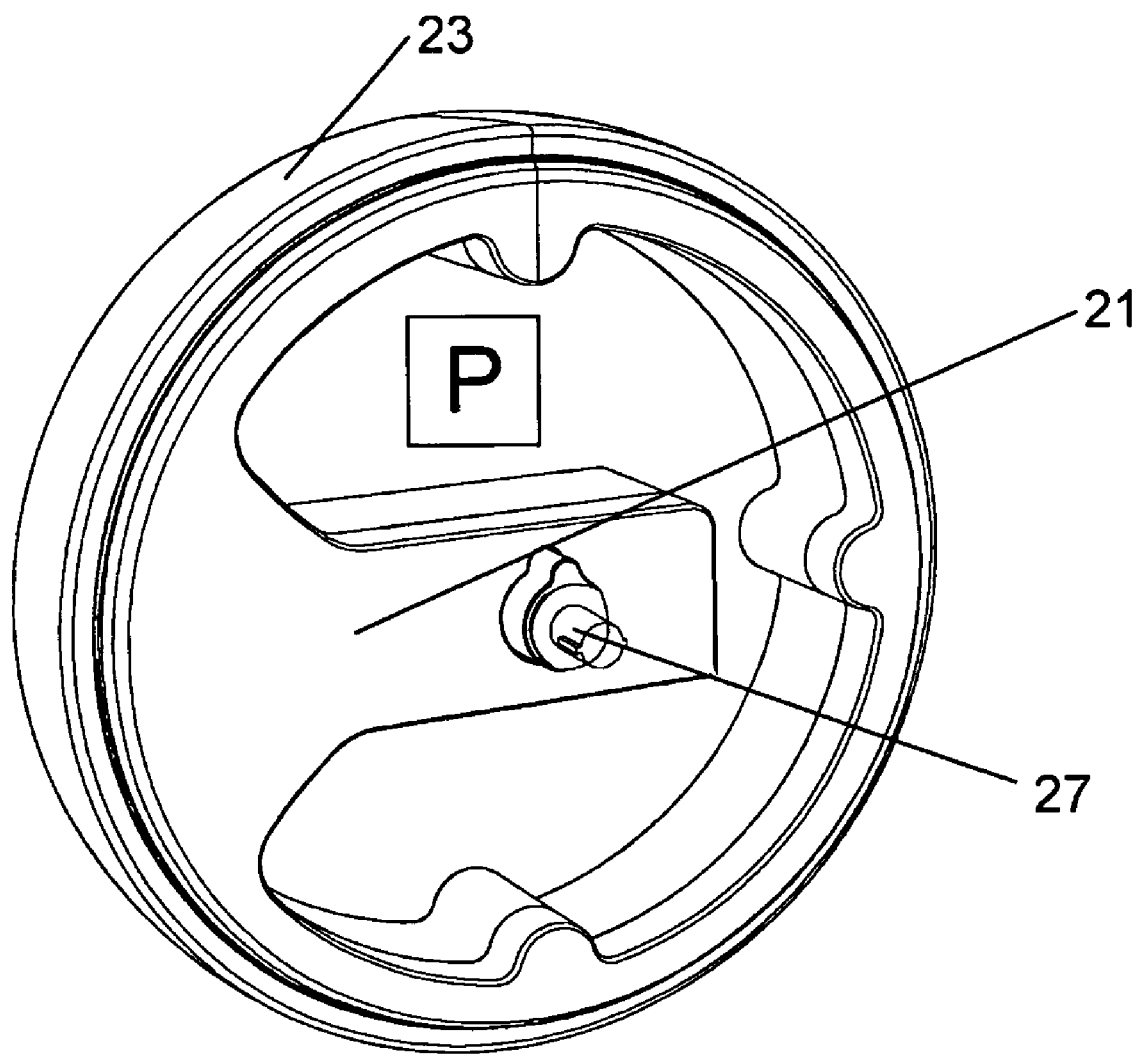
FIG. 3 is a perspective view of a driving wheel of the golf bag vehicle according to the above preferred embodiment of the present invention.

Referring to FIG. 3 of the drawings, according to an alternative mode, the power supply P mounts inside the inner room 24 of the wheel frame 21 to utilize the inner room 24 more efficiently. The processing module 32 mounts on the vehicle body 1, and connects with the detecting module 33 by wireless, so that the driving wheel 2 forms an independent working unit. Therefore, an interior structure of the driving wheel 2 is packaged, so as to further reduce the volume of the golf bag vehicle, avoid wired connection between the vehicle body 1 and the driving wheel 2, and facilitate disassembling and folding.

Preferably, the golf bag vehicle comprises two driving wheels 2, and adjusts the working manner thereof by controlling the two driving wheels 2 respectively. For example, when the two driving wheels 2 have different rolling speed, the golf bag vehicle will turn aside. According to the present invention, by real-time detecting of the detecting module 33 and real-time adjusting of the processing module 32, the golf bag vehicle is capable of moving along a straight line steadily. Particularly, when the golf bag vehicle moves along a straight line on flat ground, the controlling unit 3 switches the golf bag vehicle into a single-driving mode, that one of the driving wheels is driven to rotate by the motor 22, and the other opens the clutch therein to disconnect with the motor 22, so as to save energy. When the golf bag vehicle moves on rolling ground or needs to change direction, the controlling unit 3 switches the golf bag vehicle into a double-driving mode, that the two driving wheels 2 are driven to rotate by the motor 22.

Figure 6A:
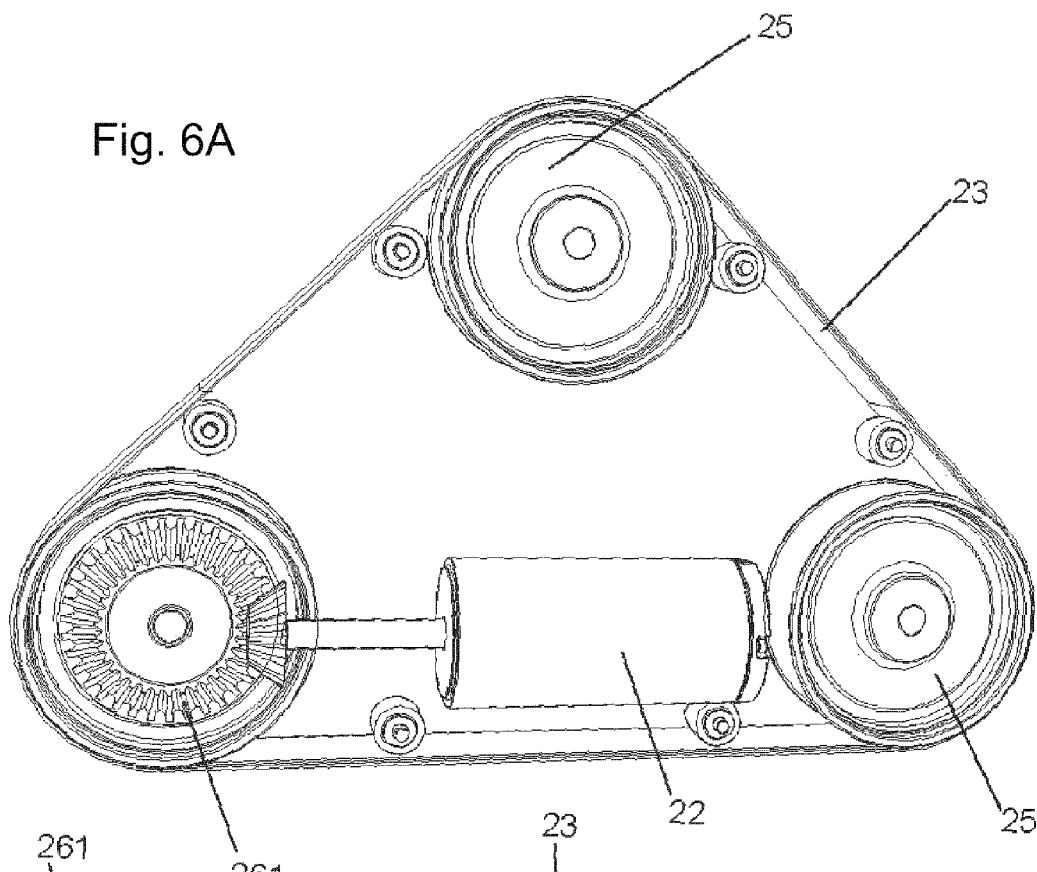
FIGS. 6A-6B illustrate an alternative mode of the driving wheel according to the above preferred embodiment of the present invention.
Figure 6B:
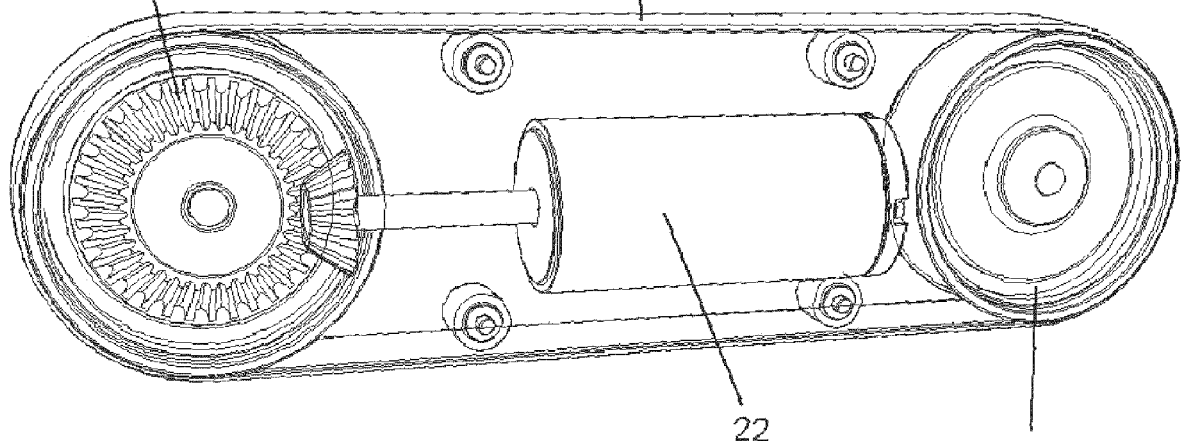

Referring to FIG. 6 of the drawings, the driving wheel 2 is preferably embodied as track-type, and the supporting wheel 25 is enlarged in size to increase capability of ground-grabbing and stability of operating. Therefore, the driving wheel 2 can not only connect to the axle 11 as a single wheel to apply to the golf bag vehicle directly, but also form a combined driving wheel to meet different requirements.

One skilled in the art will understand that the embodiment of the present invention as shown in the drawings and described above is exemplary only and not intended to be limiting.

It will thus be seen that the objects of the present invention have been fully and effectively accomplished. Its embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A golf bag vehicle, comprising:
   a vehicle body, comprising an axle mounting on a lower portion thereof; and
   two driving wheels, each comprising: a wheel frame detachably connecting with said axle and having an inner room, a motor mounting inside said inner room for electrically connecting to a power supply, and a wheel circle receiving said wheel frame therein and rotatable with respect to said wheel frame, wherein said wheel circle connects with said motor and is driven by said motor, wherein when said wheel circle rotates, said wheel frame keeps still with respect to said vehicle body, so that said driving wheel forms a self-driven structure, and
   wherein a working manner of said golf bag vehicle is adjusted by controlling the rotating speeds of said two driving wheels respectively to control said golf bag vehicle to go straight, turn, and turn off.

2. The golf bag vehicle, as recited in claim 1, further comprising a controlling unit which comprises:
   a controlling module for sending an operating order for each said driving wheel;
   a processing module connecting with said controlling module, for receiving the operating orders; and
   a detecting module mounting inside each said inner room and connecting with each said motor and said processing module, for detecting and adjusting a rolling speed of each said motor, and sending the rolling speeds to said processing module;
   wherein said processing module forwards the operating orders to each said detecting module respectively, receives the rolling speed sent by each said detecting module to compare with each the operating order, and sends a corresponding adjusting order to each said detecting module to make the rolling speed of each said motor couple with the operating orders respectively.

3. The golf bag vehicle, as recited in claim 2, wherein each said driving wheel further comprises:
   an assembling unit mounting on said wheel frame, wherein said assembling unit has a fixing groove for receiving said axle to fix said driving wheel on said axle; and
   an electric data interface mounting on each said wheel frame, wherein each said motor electrically connects with the power supply via each said electric data interface, and said assembling unit is integrated with said electric data interfaces.

4. The golf bag vehicle, as recited in claim 3, wherein the power supply and said processing module mount on said vehicle body, said motor each electrically connects with the power supply via each said electric data interface, and each said detecting module connects with said processing module via each said electric data interface, so as to control the rolling speed of said driving wheels by said controlling module.

5. The golf bag vehicle, as recited in claim 3, wherein the power supply mounts inside said inner room of said wheel frame to utilize said inner room, and said processing module mounts on said vehicle body and communicates with said detecting module by wireless, so that each said driving wheel forms an independent working unit, and connects with said vehicle body without wires.

6. The golf bag vehicle, as recited in claim 1, wherein each said wheel circle comprises a driving ring and an outer cover coating on said driving ring, wherein said driving ring connects with said motor with an inner surface thereof and is driven by said motor.

7. The golf bag vehicle, as recited in claim 2, wherein each said wheel circle comprises a driving ring and an outer cover coating on said driving ring, wherein said driving ring connects with said motor with an inner surface thereof and is driven by said motor.

8. The golf bag vehicle, as recited in claim 4, wherein each said wheel circle comprises a driving ring and an outer cover coating on said driving ring, wherein said driving ring connects with said motor with an inner surface thereof and is driven by said motor.

9. The golf bag vehicle, as recited in claim 5, wherein each said wheel circle comprises a driving ring and an outer cover coating on said driving ring, wherein said driving ring connects with said motor with an inner surface thereof and is driven by said motor.

10. The golf bag vehicle, as recited in claim 6, wherein each said driving wheel further comprises at least a supporting wheel rotatably mounting on said wheel frame and supporting on said inner surface of said driving ring, so as to fix a relative position of said driving ring and said wheel frame, and keep a predetermined distance therebetween to avoid energy loss and damaged brought by friction.

11. The golf bag vehicle, as recited in claim 7, wherein each said driving wheel further comprises at least a supporting wheel rotatably mounting on said wheel frame and supporting on said inner surface of said driving ring, so as to fix a relative position of said driving ring and said wheel frame, and keep a predetermined distance therebetween to avoid energy loss and damaged brought by friction.

12. The golf bag vehicle, as recited in claim 8, wherein each said driving wheel further comprises at least a supporting wheel rotatably mounting on said wheel frame and supporting on said inner surface of said driving ring, so as to fix a relative position of said driving ring and said wheel frame, and keep a predetermined distance therebetween to avoid energy loss and damaged brought by friction.

13. The golf bag vehicle, as recited in claim 9, wherein each said driving wheel further comprises at least a supporting wheel rotatably mounting on said wheel frame and supporting on said inner surface of said driving ring, so as to fix a relative position of said driving ring and said wheel frame, and keep a predetermined distance therebetween to avoid energy loss and damaged brought by friction.

14. The golf bag vehicle, as recited in claim 6, wherein each said motor mounts perpendicular to a rotating axis of said wheel circle, and comprises a motor gear mounting on a head of said motor, wherein said driving wheel further comprises a transmitting unit comprising a transmitting gear rotatably mounting on said wheel frame, having a rotating axis parallel to the rotating axis of said wheel circle and engaging with said motor gear, wherein said driving ring has a plurality of corresponding gear teeth provided on said inner surface thereof for engaging with said transmitting gear, so as to drive said driving ring by said motor.

15. The golf bag vehicle, as recited in claim 7, wherein each said motor mounts perpendicular to a rotating axis of said wheel circle, and comprises a motor gear mounting on a head of said motor, wherein said driving wheel further comprises a transmitting unit comprising a transmitting gear rotatably mounting on said wheel frame, having a rotating axis parallel to the rotating axis of said wheel circle and engaging with said motor gear, wherein said driving ring has a plurality of corresponding gear teeth provided on said inner surface thereof for engaging with said transmitting gear, so as to drive said driving ring by said motor.

16. The golf bag vehicle, as recited in claim 8, wherein each said motor mounts perpendicular to a rotating axis of said wheel circle, and comprises a motor gear mounting on a head of said motor, wherein said driving wheel further comprises a transmitting unit comprising a transmitting gear rotatably mounting on said wheel frame, having a rotating axis parallel to the rotating axis of said wheel circle and engaging with said motor gear, wherein said driving ring has a plurality of corresponding gear teeth provided on said inner surface thereof for engaging with said transmitting gear, so as to drive said driving ring by said motor.

17. The golf bag vehicle, as recited in claim 9, wherein each said motor mounts perpendicular to a rotating axis of said wheel circle, and comprises a motor gear mounting on a top of said motor, wherein said driving wheel further comprises a transmitting unit comprising a transmitting gear rotatably mounting on said wheel frame, having a rotating axis parallel to the rotating axis of said wheel circle and engaging with said motor gear, wherein said driving ring has a plurality of corresponding gear teeth provided on said inner surface thereof for engaging with said transmitting gear, so as to drive said driving ring by said motor.

18. The golf bag vehicle, as recited in claim 10, wherein each said motor mounts perpendicular to a rotating axis of said wheel circle, and comprises a motor gear mounting on a top of said motor, wherein said driving wheel further comprises a transmitting unit comprising a transmitting gear rotatably mounting on said wheel frame, having a rotating axis parallel to the rotating axis of said wheel circle and engaging with said motor gear, wherein said driving ring has a plurality of corresponding gear teeth provided on said inner surface thereof for engaging with said transmitting gear, so as to drive said driving ring by said motor.

19. The golf bag vehicle, as recited in claim 14, wherein a clutch is mounted between said motor and said transmitting gear for controlling said motor and said transmitting gear to detach from each other, so as to switch said golf bag vehicle between a driving mode and a manual mode.

20. The golf bag vehicle, as recited in claim 18, wherein a clutch is mounted between said motor and said transmitting gear for controlling said motor and said transmitting gear to detach from each other, so as to switch said golf bag vehicle between a driving mode and a manual mode.

* * * * *